United States Patent
Colette et al.

(10) Patent No.: US 7,046,491 B2
(45) Date of Patent: May 16, 2006

(54) DEVICE FOR PROTECTING AN ELECTRIC SOURCE ADAPTED TO POWER AN ELECTRIC MEMBER

(75) Inventors: Olivier Colette, Port Royal (FR); Benjamlin Frugier, Paris (FR)

(73) Assignee: Valeo Climatisation, La Verriere (FR)

(*) Notice: Subject to any disclaimer, the term of this patent is extended or adjusted under 35 U.S.C. 154(b) by 181 days.

(21) Appl. No.: 10/089,406

(22) PCT Filed: Jul. 25, 2001

(86) PCT No.: PCT/FR01/02441

§ 371 (c)(1),
(2), (4) Date: Aug. 8, 2002

(87) PCT Pub. No.: WO02/11275

PCT Pub. Date: Feb. 7, 2002

(65) Prior Publication Data

US 2003/0026050 A1 Feb. 6, 2003

(30) Foreign Application Priority Data

Jul. 31, 2000 (FR) .................................. 00 10082

(51) Int. Cl.
*H02H 5/04* (2006.01)

(52) U.S. Cl. ....................................................... 361/23
(58) Field of Classification Search .................. 361/18, 361/23, 20, 22; 318/434; 700/295

See application file for complete search history.

(56) References Cited

U.S. PATENT DOCUMENTS

| | | | |
|---|---|---|---|
| 5,191,520 A | 3/1993 | Eckersley | |
| 5,444,359 A * | 8/1995 | Riggio | 323/237 |
| 5,473,497 A * | 12/1995 | Beatty | 361/23 |
| 5,477,091 A | 12/1995 | Fiorina et al. | |
| 5,587,642 A * | 12/1996 | Manson et al. | 318/812 |
| 5,604,421 A | 2/1997 | Barnsley | |
| 5,757,634 A | 5/1998 | Ferens | |
| 6,411,059 B1 * | 6/2002 | Frugier et al. | 318/663 |
| 6,753,670 B1 * | 6/2004 | Kadah | 318/727 |
| 6,809,912 B1 * | 10/2004 | Hu et al. | 361/58 |
| 6,819,060 B1 * | 11/2004 | Readio et al. | 315/291 |

FOREIGN PATENT DOCUMENTS

DE        40 00 954 A1    7/1991

* cited by examiner

*Primary Examiner*—Brian Sircus
*Assistant Examiner*—James Demakis
(74) *Attorney, Agent, or Firm*—Ronald Courtney

(57) ABSTRACT

The invention concerns a device for protecting an electric source adapted to power an electric member comprising a test unit (6) adapted to deliver a signal (8) representing the availability of the electric source (2), to a control unit (10). The unit (10) determines an operating mode of the electric member (4) wherein the power consumption of the electric member is a function of the availability signal (8) received from the test unit (6). The electric source (2) can power directly the electric member (4) and the control unit (10) can act on the electric member itself. The control unit (10) can also be interposed between the electric source (2) and the electric member (4) to modify at least one characteristic of the current powering the electric member.

10 Claims, 4 Drawing Sheets

DEVICE FOR PROTECTING AN ELECTRIC SOURCE ADAPTED TO POWER AN ELECTRIC MEMBER

BACKGROUND OF THE INVENTION

1. Field of the Invention

The invention relates to the supply of electrical energy to electrical components installed on board a motor vehicle.

2. Background of the Related Art

Modern motor vehicles comprise numerous auxiliary equipments essential for the functioning of the vehicle such as pumps and fans, or which provide additional comfort and safety, like air-conditioning installations, devices to prevent the locking of brakes, known as "ABS", safety airbags, etc. Some of these devices, like the safety airbags, can be operated only electrically. Others, such as fans and pumps, can be driven mechanically by the engine itself. But their functioning is then linked with the engine speed, which constitutes a significant disadvantage.

That is why these equipments are increasingly driven by the intermediary of an electric motor that is itself powered by an electrical source of the vehicle. This makes it possible to decouple the functioning of these devices from that of the engine and, for example, to make them operate even when the engine is stopped or is running at idling speed. However, this tendency to actuate equipments of the vehicle increasingly in an electrical manner imposes a heavy load on the electrical source of the vehicle. The latter can therefore get into a state of availability that is inadequate for ensuring the functioning of vital safety devices (safety airbags, ABS). For example, if the electrical energy source is an accumulator battery, its charge can be insufficient.

That is why the need is felt for a device capable of protecting the electrical source of a vehicle in such a way that it always remains available to ensure certain essential safety functions.

SUMMARY OF THE INVENTION

The present invention is directed to a device for protecting an electrical source capable of powering at least one electrical component, comprising a test unit capable of delivering a signal representative of the level of availability of the electrical source to a control unit, this control unit determining an operating mode of the electrical component in which the consumption of electrical energy of the latter depends on the availability signal received from the control unit.

The electrical component can be a motor driving a compressor or a cooling pump of the engine. It can also be a fan motor, a resistive element with a positive temperature coefficient or even a catalytic converter. The electrical source will most often consist of an accumulator battery, but it can also be an alternator or a fuel cell.

The control unit determines the state of availability of the electrical source. For example, if this source is a battery, the control unit determines its state of charge. On the basis of this information, the control unit establishes an operating mode of the electrical component chosen from among several possibilities. For example, if the availability state of the electrical source is higher than an upper threshold, the electrical component will operate at full power or will at least be able to operate at this power. If the availability of the electrical source is between an upper threshold and a lower threshold, the electrical component will have a degraded operating mode in which it will operate at only a portion of its power. Finally, if the availability state of the electrical source is below a lower threshold, the control unit will, purely and simply, stop the operation of the electrical component.

Thus, in the degraded operating mode, the electrical source supplies only a portion of the total power of the electrical component and when its availability state is below the lower threshold, it does not supply any energy to the electrical component. The electrical source is therefore protected and remains available for operating, in the case of need, components essential for the safety of the vehicle.

According to a first embodiment, the electrical source powers the electrical component directly and the control unit acts on the electrical component itself in such a way as to determine the quantity of electrical energy that the latter requests from the electrical source for its operation. This embodiment applies advantageously in the case where the electrical component is a resistive component, such as a resistive element with a positive temperature coefficient used for heating the passenger compartment of the vehicle. In the degraded mode of operation, the control unit will be able to modify the connection of this resistive element in such a way that it absorbs no more than a limited electric current and, when the availability of the source is below the value of the lower threshold, the control unit will cut off the power supply to this resistive element.

According to another embodiment, the control unit is interposed between the electrical source and the electrical component, and the control unit modifies, to a greater or lesser degree, a characteristic of the electric current which supplies the electrical component in such a way as to limit the quantity of energy supplied to the electrical component by the electrical source.

This embodiment applies advantageously in the case where the electrical component is a motor whose speed of rotation can be varied by changing the frequency of the current supplying it. If the frequency of the current reduces, the speed of rotation of the motor also reduces and, consequently, the electrical power absorbed is lower.

In one embodiment, the control unit consists of an inverter, capable of applying a variable frequency to the electrical component, and of a control circuit of the inverter, this circuit comprising an assembly of resistors interposed between a ground terminal and a maximum voltage terminal of the inverter, the assembly of resistors having a plurality of connection terminals capable of being connected to an intermediate terminal of the inverter via a control line provided with adjustment means, the availability signal delivered by the test unit being supplied to the adjustment means such that it connects the intermediate terminal of the inverter to a connection terminal of the assembly of resistors determined according to the availability signal.

In a variant embodiment, the assembly of resistors consists of a divider bridge that comprises a plurality of resistors determining connection terminals between them and at their ends, the adjustment means connecting the control line to one of these connection terminals according to the availability signal.

In another embodiment, the assembly of resistors can consist of a single resistor, forming a potentiometer, and comprising a single connection terminal that can be moved in a continuous manner from one end to the other of the single resistor.

In a particular embodiment, the divider bridge comprises two resistors determining between them a node, the control unit consisting of a first switch having a normal operating position in which the control line is connected directly or by the intermediary of a protective resistor to the maximum voltage terminal of the inverter in order to allow a normal operating mode of the electrical component, and a degraded operation position in which the control line is connected to the node of the divider bridge in order to allow a degraded operating mode of the electrical component, and by a second switch having a closed position in which the control line is connected to the ground terminal of the inverter in order to prohibit the operation of the electrical component.

Advantageously, the assembly of resistors comprises a potentiometer having its end terminals directly or indirectly connected to the maximum voltage terminal and to the ground terminal of the inverter, and a slider terminal connected to the intermediate terminal of the inverter by the intermediary of the first switch when the latter is in its closed position, the device furthermore comprising a manual control adjustable by an operator and capable of controlling the potentiometer directly or indirectly.

The two resistors of the divider bridge can be separate from the potentiometer, or the potentiometer can constitute one of the two resistors of the divider bridge.

This embodiment applies advantageously in the case where the electrical component is a component that can be controlled manually by a passenger of the vehicle. If the control unit has determined that the electrical source was in an availability state that was sufficient for its normal operation to be possible (availability above the upper threshold), the driver of the vehicle or his passengers can adjust the functioning of the electrical component as they wish, for example a motor driving the compressor of an air-conditioning system.

The electrical component can, in particular, be an electric motor driving a compressor of an air-conditioning system and the manual control is capable of obtaining a continuous adjustment of the speed of the motor between a minimum speed corresponding to a "warmest" mode and a maximum speed corresponding to a "coolest" mode, when the device is in the normal operating mode.

Other features and advantages of the present invention will furthermore appear on reading the following description referring to the appended figures.

DETAILED DESCRIPTION OF THE PREFERRED EMBODIMENT

Figure 1:
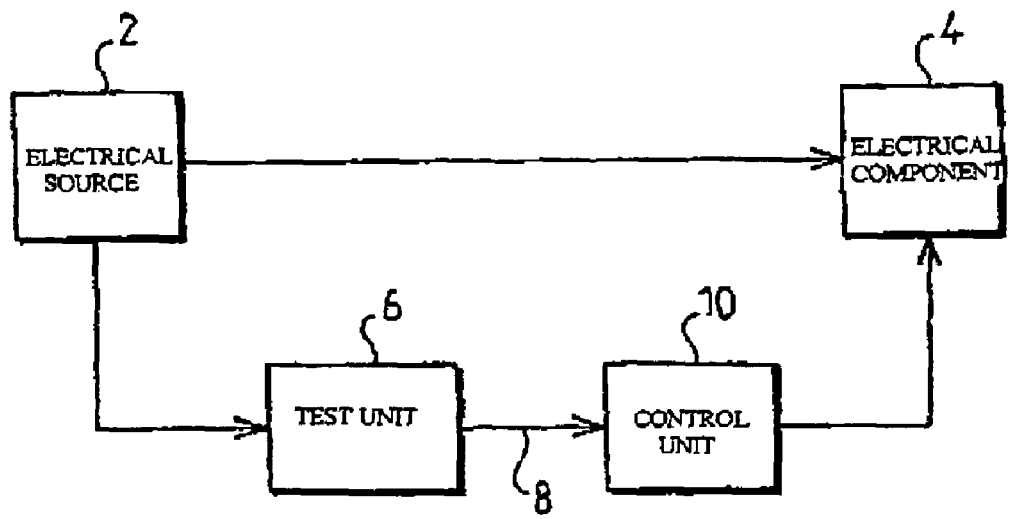
FIG. 1 is a block diagram of a first embodiment of the invention in which the control unit controls the operation of the electrical component itself.

In FIG. 1, the reference 2 denotes an electrical source such as an accumulator battery or even an alternator or a fuel cell. The electrical source 2 supplies an electrical component 4 such as a motor driving a fan, a pump, a compressor of an air-conditioning system or even a catalytic converter or a resistive element with a positive temperature coefficient (PTC). A test unit 6 determines the availability of the electrical source 2, in other words its capability of supplying electrical energy to the electrical component 4. For example, if the electrical source is an accumulator battery, as is frequently the case, the test unit determines the charge of that accumulator.

The test unit 6 transmits an availability signal 8 depending on the availability of the source 2. The signal 8 is applied to a control unit 10 which determines an operating mode of the electrical component adapted to the availability state of the electrical source. If the electrical source is a battery, the control unit 10 determines the charge level C of the battery. This charge level is for example expressed as a percentage of the maximum charge. Depending on this charge level, the control unit 10 determines, for the electrical component 4, an operating mode chosen from among several possible ones, for example at least two operating modes, a normal operating mode and a degraded operating mode. Between the maximum charge level $C_{max}$ and a first charge level $C_1$, less than or equal to $C_{max}$, the control unit 10 establishes a normal operating mode of the electrical component 10, in other words an operating mode in which the electrical component can operate at full power. When the charge level of the battery 2 is between $C_1$ and a second charge level $C_2$, lower than $C_1$, the control unit 10 establishes a degraded operating mode of the electrical component 4 or stops the latter purely and simply.

In the embodiment shown in FIG. 1, the electrical source supplies the electrical component 4 directly and the control unit 10 modifies the configuration of the electrical component in such a way as to limit the quantity of electrical energy that the latter requires from the electrical source 2 for its operation in the degraded operating mode. For example, if the electrical component consists of electrical resistors, the interconnections of these resistors will be modified in such a way that the electrical power called upon reduces.

Figure 2:
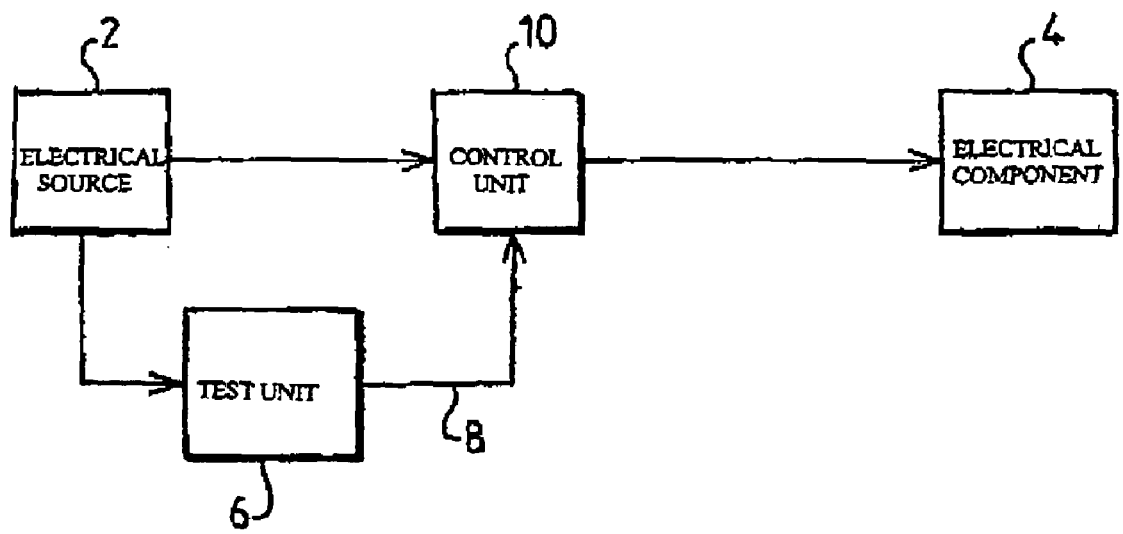
FIG. 2 is a block diagram of a second embodiment of the invention in which the control unit is interposed between the electrical source and the electrical component.

FIG. 2 shows a second embodiment of the invention. It differs from the embodiment shown in FIG. 1 in that the control unit 10 is interposed between the electrical source 2 and the electrical component 4. Whereas, in the embodiment shown in FIG. 1, the current from the electrical source 2 is supplied directly to the electrical component 4, in the embodiment shown in FIG. 2, the current from the electrical source 2 is supplied to the control unit 10 and the latter modifies at least one characteristic of this current, such as its voltage or its current value, before transmitting it to the electrical component 4. If the electrical source 2 is a battery which delivers direct current, the control unit 10 can convert this direct current into an alternating current of variable frequency.

This embodiment applies particularly in the case where the electrical component 4 comprises a synchronous electric motor whose speed of rotation is set according to the frequency of the electrical current supplied to it. As in the preceding embodiment, the control unit 10 can thus determine an operating mode of the electrical component 4 from among a plurality of possibilities, for example a normal operation mode, a degraded operating mode in which the electrical component operates at a portion of its power and a stopped mode. The operating mode of the electrical component is determined, as described above, according to the availability signal 8 supplied by the test unit 6 to the control unit 10.

Figure 3:
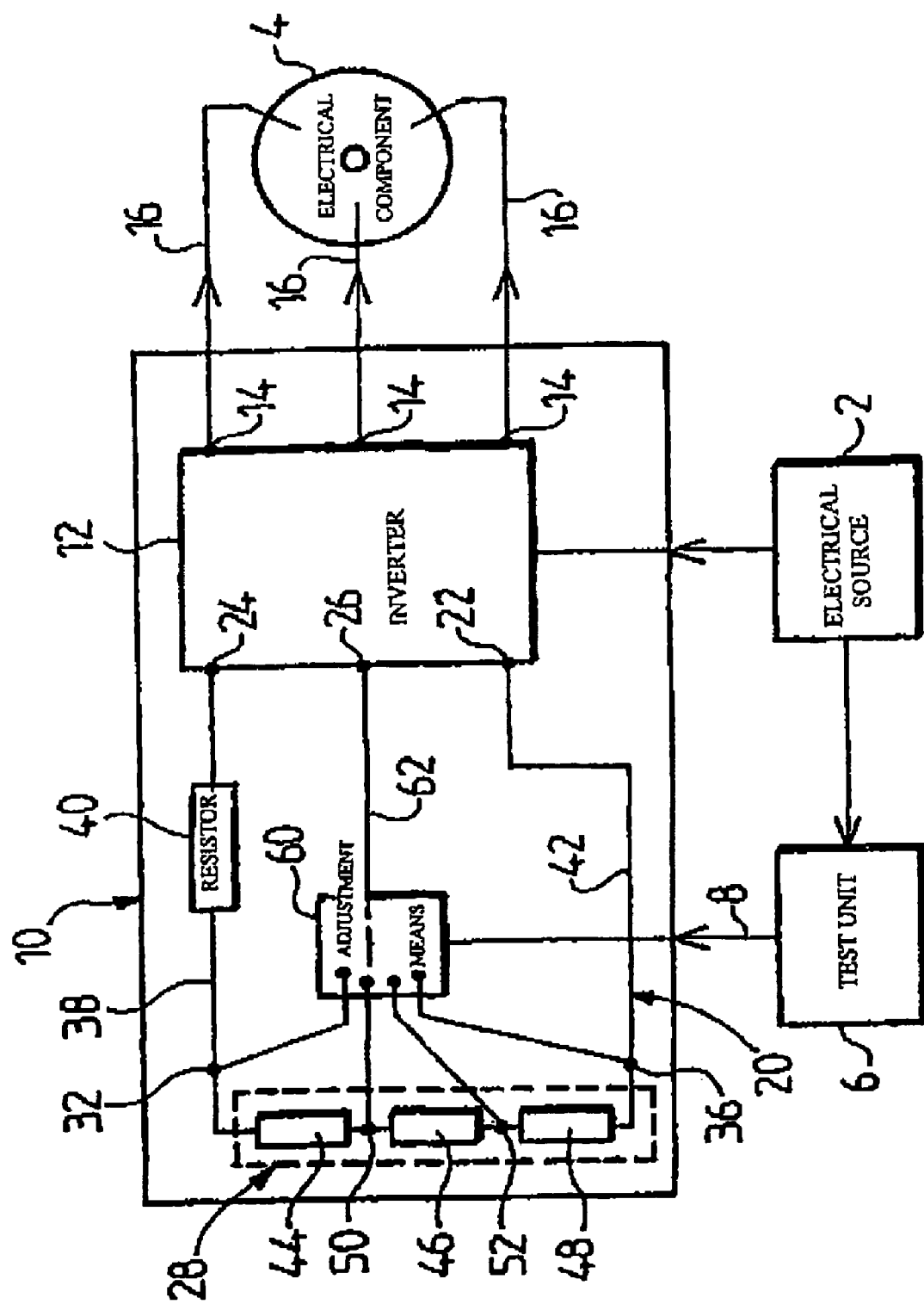
FIG. 3 is a block diagram of the control unit comprising an inverter capable of applying a variable frequency to an electrical component constituted by a synchronous motor.

FIG. 3 shows a particular embodiment of a control unit 10 able to be used in a control device of the invention as shown in FIG. 2. The control device comprises an inverter 12 capable of applying an electrical current of variable frequency to an electrical component consisting of a three-phase electric motor 4 of the synchronous type. The inverter 12 has three outputs 14 connected to the motor 4 by three lines 16 respectively corresponding to the three phases of the three-phase current. The inverter 12 is connected to an electrical power supply source 2, such as a high-power battery or an alternator set capable of delivering a DC voltage Uht.

The inverter 12 is controlled by a control circuit given the general reference 20. The inverter comprises three terminals: a ground terminal 22 corresponding to a zero voltage (U=0 volt), a maximum voltage terminal 24 corresponding to a maximum voltage (U=$U_{max}$) generated by the inverter, and an intermediate terminal 26, called the slider terminal, corresponding to a variable voltage (U=$U_{var}$), of between 0 volt and $U_{max}$.

In the example, the maximum voltage $U_{max}$ is 5 volts and the supply frequency of the motor can vary from 0 Hertz, for the voltage U=0, up to 150 Hertz for the voltage $U_{max}$=5 volts.

The control circuit 20 also comprises an assembly of resistors, given the overall general reference 28, interposed between the ground terminal 22 and the maximum voltage terminal 24 of the inverter 12. For this purpose, the assembly of resistors comprises a first end terminal 32 connected to the maximum voltage terminal by a line 38 on which there is interposed a protective resistor 40, and a second end terminal 36 connected by a line 42 to the ground terminal 22 of the inverter.

The assembly of resistors 28 consists of several resistors, three in the embodiment shown, that is to say the resistors 44, 46 and 48. The resistors 44 and 46 determine between themselves a connection terminal 50, whilst the resistors 46 and 48 determine between themselves a connection terminal 52. In total, the assembly of resistors 28, consisting of three resistors, therefore has four connection terminals, counting the two end terminals 32 and 36. Finally the control circuit 20 comprises adjustment means 60.

The availability signal of the electrical source 2 transmitted by the test unit 6 is applied to the adjustment means 60. These adjustment means are connected to the intermediate terminal 26 of the inverter 12 by a control line 62. The adjustment means 60 determine to which connection terminal of the assembly of resistors 8 the control line 62 will be connected. These control means can therefore determine, in the example of embodiment shown, four operating modes of the electric motor 4. When the control line 62 is connected to the connection terminal 32, the frequency of the electrical current supplied to the motor is maximal, which corresponds to the normal operating mode. When the control line 62 is connected to the connection terminal 40, the resistor 44 on the one hand and the resistors 46 and 48 on the other hand constitute a divider bridge which limits the voltage applied to the intermediate terminal 26 of the inverter. The frequency of the electric current supplied to the motor is therefore reduced, which corresponds to a degraded operating mode. If the control line 62 is connected to the connection terminal 52, the situation is identical, but the control voltage of the inverter is lower and the frequency of the current will also be lower. This operating mode therefore corresponds to a second degraded operating mode in which the protection of the electrical source is greater than in the previous case. Finally, when the control line 62 is connected to the connection terminal 36, the stopping of the motor 4 is commanded by the grounding of the intermediate terminal of the inverter. The electrical source 2, which no longer supplies any current, is then fully protected.

Figure 4:
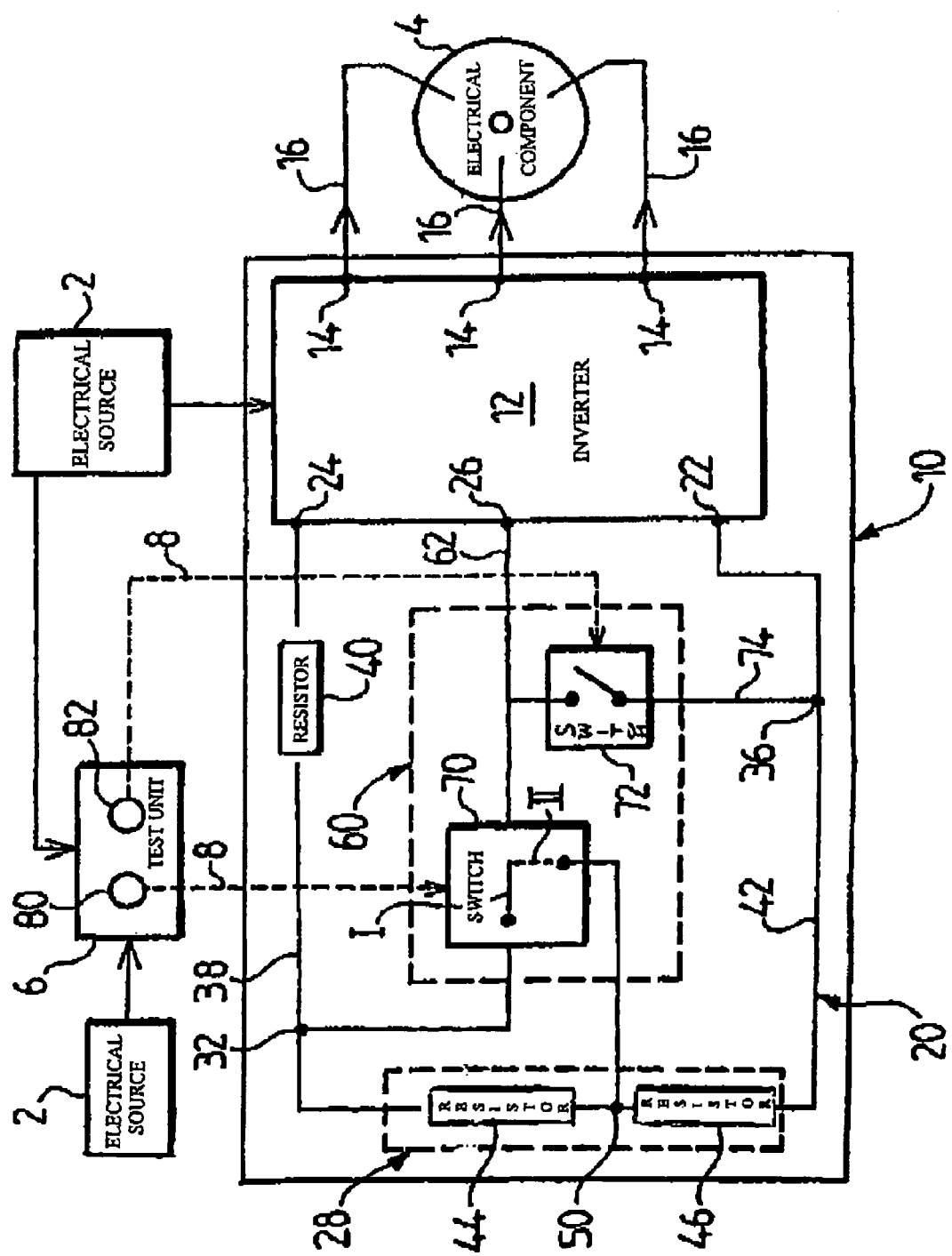
FIG. 4 is diagram of a particular embodiment in which the control circuit of the inverter comprises two separate switches.

FIG. 4 shows a particular embodiment of a device for protecting an electrical source according to the invention. In this embodiment, the assembly of resistors 28 consists of only two resistors, namely the resistors 44 and 46, which determine between themselves a single connection terminal 50. The assembly of resistors 28 therefore comprises three connection terminals in total, the two end terminals 32 and 36 and the terminal 50 contained between the resistors 44 and 46.

The adjustment means, denoted by the general reference 60, consist of two separate switches, namely a first switch 70 and a second switch 72. The switch 70 has two positions. In a first position (position I or the closed position), the control line 62 is connected to the connection terminal 32, that is itself connected, possibly by the intermediary of a protective resistor 40, to the maximum voltage terminal 24 of the inverter 12. This allows a normal operating mode in which the speed of rotation is maximal.

In a second position (position II), the control line 62 is connected to the connection terminal 50 located between the resistors 44 and 46. As explained above with reference to FIG. 3, the assembly of resistors 28 acts as a divider bridge which limits the voltage applied to the intermediate terminal 26 of the inverter, which commands a degraded operating mode of the motor.

The second switch 72 is fitted in a line 74 connecting the control line 62 and the line 42. When the switch 72 is in its open position, as shown in FIG. 4, it is the switch 70 that determines the normal or degraded operating mode of the motor. On the contrary, when the switch 72 is in its closed position, the intermediate terminal 26 of the inverter is connected to the ground terminal 22 and the voltage applied to the terminal 26 is zero. This commands the stoppage of the motor. The switch 70 is controlled by a first sensor 80 and the second switch 72 is controlled by a second sensor 82 forming part of the test unit 6. In other words, this embodiment is characterized by the fact that the adjustment means 60 consist of two separate switches, each one controlled by a separate signal 8.

The three operating modes are summarized in the following table.

|  | C < 40% | 40% < C < 60% | 60% < C |
| --- | --- | --- | --- |
| Switch wire 70 | 0 volt | 0 volt | 12 volts |
| Switch wire 72 | 0 volt | 12 volts | 12 volts |
| Switch 70 | Position II (or immaterial) | Position II | Position I |
| Switch 72 | Closed | Open | Open |
| Mode | Stopped | Degraded | Normal |

In the example embodiments shown in FIGS. 3 and 4, the operating mode of the motor is determined automatically, and exclusively on the basis of the availability of the electrical source 2. An operator cannot adjust the speed of rotation of this motor.

Figure 5:
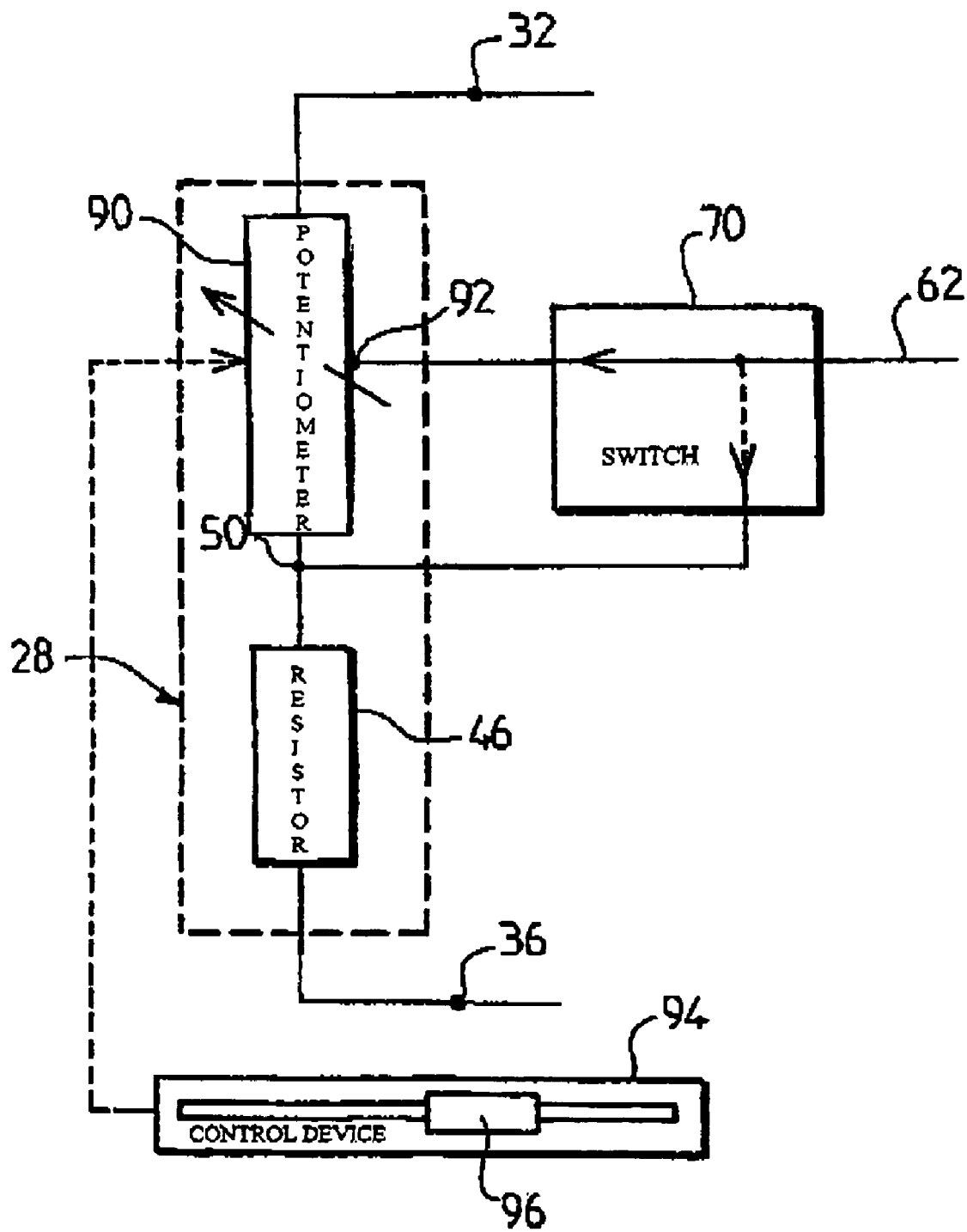
FIG. 5 is a diagram of an assembly of resistors comprising a manual control which can be operated by an operator.

FIG. 5 shows a variant embodiment which comprises adjustment means accessible to an operator. This embodiment is similar to the one shown in FIG. 4 but the resistor 44, instead of having a fixed value, has been replaced by a potentiometer 90.

This potentiometer 90 comprises a slider terminal 92 connected to the intermediate terminal 26 of the inverter via the control line 62 and the first switch 70. When the availability of the electrical source is sufficient to allow a normal operation of the motor, the control line 62, instead of being connected to the end terminal 32 of the assembly of resistors 28, is connected to the slider terminal 92. The potentiometer 90 is connected to a manual control 94 provided on the dashboard of the motor vehicle.

The manual control comprises a handle 96 of the slider type able to be displaced either in translation or in rotation between two end positions corresponding to a maximum value and a minimum value of the resistance of the potentiometer. When the value of the resistance of the potentiometer is minimal, the slider terminal 92 is merged with the connection terminal 32 and the speed of rotation of the motor is maximal. On the contrary, when the resistance of the potentiometer is maximal, the slider terminal is merged with the intermediate terminal 50 and the speed of rotation of the motor is limited.

However, in this case, the origin of the limitation of the speed of rotation of the motor is the operator's desire, and not the necessity of protecting the electrical source since the control unit has determined that the availability of the latter was sufficient (higher than the upper threshold) to allow the normal operation of the electrical component 4.

This example embodiment, in which an operator can adjust the speed of rotation of the motor according to his wishes, when the availability of the source is sufficient, applies for example to the adjustment of an air-conditioning system in which the adjustment handle 96 can be displaced between a so-called "coolest" position and a "warmest" position in order to adapt the temperature inside the passenger compartment as a function of the outside temperature.

The invention claimed is:

1. Device for protecting an electrical source for powering at least one electrical component (4), wherein the device comprises a test unit (6) that delivers a signal (8) representative of a level of availability of the electrical source (2) to a control unit (10), the control unit (10) determining an operating mode of the electrical component (4) in which the consumption of electrical energy of the electrical component depends on the availability signal (8) received from the test unit (6), and an inverter (6) connected to the electrical source (2), wherein the electrical component is a motor, and the control unit (10) is interposed between the electrical source (2) and the electrical component (4), and in that the control unit (10) modifies the frequency of an electric current which supplies the electrical component (4) to limit the quantity of energy supplied to the electrical component by the electrical source (2).

2. Device for protecting an electrical source capable of powering at least one electrical component (4), wherein the device comprises a test unit (6) capable off delivering a signal (8) representative of a level of availability of the electrical source (2) to a control unit (10), the control unit (10) determining an operating mode of the electrical component (4) in which the consumption of electrical energy of the electrical component depends on the availability signal (8) received from the test unit (6), wherein the control unit (10) is interposed between the electrical source (2) and the electrical component (4), and in that the control unit (10) modifies at least one characteristic of an electric current which supplies the electrical component (4) to limit the quantity of energy supplied to the electrical component by the electrical source (2), wherein the control unit (10) includes an inverter (12), applying an electric current of variable frequency to the electrical component (4), and of a control circuit (20) of the inverter (12), the control circuit comprising an assembly of resistors (28) interposed between a ground terminal (22) and a maximum voltage terminal (24) of the inverter, the assembly of resistors (28) having a plurality of connection terminals (32, 36, 50, 52) capable of being connected to an intermediate terminal (26) of the inverter (12) via a control line (62) provided with adjustment means (60), the availability signal (8) delivered by the test unit (6) being supplied to the adjustment means (60) such that the adjustment means connects the intermediate terminal (26) of the inverter to a connection terminal (32, 36, 50, 52) of the assembly of resistors (28) determined according to the availability signal (8).

3. Protection device according to claim 2, wherein the assembly of resistors (28) includes a divider bridge having a plurality of resistors (44, 46, 48) and connection terminals (32, 36, 50, 52) disposed between each of the plurality of resistors and adjacent opposite ends of the plurality of resistors, the adjustment means (60) connecting the control line (62) to one of the connection terminals (32, 36, 50, 52) according to the availability signal (8).

4. Protection device according to claim 3, wherein the divider bridge comprises two resistors (44, 46) having a node (50) disposed there between, and the adjustment means (60) includes a first switch (70) having a normal operating position in which the control line (62) is connected directly or by the intermediary of a protective resistor (40) to the maximum voltage terminal (24) of the inverter (12) in order to allow a normal operating mode of the electrical component (4), and a degraded operation position in which the control line (62) is connected to the node (50) of the divider bridge in order to allow a degraded operating mode of the electrical component (4), and by a second switch (72) having a closed position in which the control line (62) is connected to the ground terminal (22) of the inverter (12) in order to prohibit the operation of the electrical component.

5. Protection device according to claim 4, wherein the assembly of resistors (28) comprises a potentiometer (90) having end terminals (32, 50) connected to the maximum voltage terminal (24) and to the ground terminal (22) of the inverter, and a slider terminal (92) connected to the intermediate terminal (26) of the inverter by the intermediary of the first switch (70) when the first switch is in its closed position, and a manual control (94) device adjustable by an operator and capable of controlling the potentiometer (90) directly or indirectly.

6. Protection device according to claim 5, wherein the two resistors (44, 46) of the divider bridge (28) are separate from the potentiometer (90).

7. Protection device according to claim 5, wherein the potentiometer (90) constitutes one of the two resistors (44, 46) of the divider bridge.

8. Protection device according to one of claim 5, wherein the electrical component is an electric motor (4) driving a compressor of an air-conditioning system and the manual control device (94) obtains a continuous adjustment of the speed of the motor between a minimum speed corresponding to a "warmest" mode and a maximum speed corresponding to a "coolest" mode.

9. Protection device according to claim 6, wherein the electrical component is an electric motor (4) driving a compressor of an air-conditioning system and in that the manual control (94) obtains a continuous adjustment of the speed of the motor between a minimum speed corresponding to a "warmest" mode and a maximum speed corresponding to a "coolest" mode.

10. Protection device according to claim 7, wherein the electrical component is an electric motor (4) driving a compressor of an air-conditioning system and in that the manual control (94) obtains a continuous adjustment of the speed of the motor and in that the manual control (94) is capable of obtaining a continuous adjustment of the speed of the motor between a minimum speed corresponding to a "warmest" mode and a maximum speed corresponding to a "coolest" mode.

* * * * *